United States Patent
Yamamoto et al.

(10) Patent No.: US 7,685,594 B2
(45) Date of Patent: Mar. 23, 2010

(54) METHOD AND DATA STRUCTURE FOR RECONFIGURING A SOFTWARE PACKAGE

(75) Inventors: Tadashi Yamamoto, Yamato (JP); Naoki Yamakoshi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 11/458,159

(22) Filed: Jul. 18, 2006

(65) Prior Publication Data

US 2007/0022420 A1  Jan. 25, 2007

(30) Foreign Application Priority Data

Jul. 20, 2005  (JP)  ............................ 2005-209455

(51) Int. Cl.
   *G06F 9/445* (2006.01)
(52) U.S. Cl. ........................................ 717/174; 717/168
(58) Field of Classification Search ........................ None
   See application file for complete search history.

(56) References Cited

U.S. PATENT DOCUMENTS

| 6,282,711 B1* | 8/2001 | Halpern et al. | .............. 717/175 |
| 6,324,691 B1* | 11/2001 | Gazdik | ...................... 717/178 |
| 6,496,979 B1* | 12/2002 | Chen et al. | .................. 717/178 |

2003/0056102 A1*  3/2003  Aho et al. ................... 713/176

FOREIGN PATENT DOCUMENTS

| JP | 08-083245 | 3/1996 |
| JP | 2000-010782 | 1/2000 |
| JP | 2000-285048 | 10/2000 |
| JP | 2004-013224 | 1/2004 |
| JP | 2005-502118 | 1/2005 |
| WO | 03/021432 A1 | 3/2003 |

OTHER PUBLICATIONS

IBM, Information Materials for IDS, Japanese Office Action Dated Nov. 21, 2006.
Japanese Patent No. JP8-83245, 1 page, no translation available.

* cited by examiner

*Primary Examiner*—Michael J Yigdall
(74) *Attorney, Agent, or Firm*—Andrea Bauer Hoffman Warnick LLC (57) ABSTRACT

The present invention provides a method of configuring a package that enables the reduction of load on a network without a temporary need for a large recording area on the client side when reconfiguring a software package from given components. A second computer receives, from a first computer, combination information on a combination of one or more components and position information indicating storage locations of components recorded in the first computer, receives a selection of given components from a user, determines the combination of the components selected based on the combination information, receives the selected components based on the determination of the combination and the position information corresponding to the selected components, and configures the secondary software package using the received components.

9 Claims, 6 Drawing Sheets

METHOD AND DATA STRUCTURE FOR RECONFIGURING A SOFTWARE PACKAGE

FIELD OF THE INVENTION

The present invention relates to a method of reconfiguring a software package and a data structure of the software package, and more particularly to a method of reconfiguring a software package by using a program operating on a computer and a data structure of the software package.

BACKGROUND OF THE INVENTION

With the diversification of software products in recent years, there is a tendency of a software package to be composed of a large number of components. A software user, however, rarely uses all of the components and a vendor providing a software product is required to distribute a software package (hereinafter, appropriately referred to as "package") including only components highly needed by customers.

Normally, when configuring an optimal package for a customer, a vendor as a primary provider selects software programs (hereinafter, referred to as "components") meeting the needs of the customer for the package configuration.

For example, when a vendor provides an operating system as a package, required components depend upon languages provided by the operating system. Therefore, in most cases, components for one language appropriate for the customer are selected out of English, Japanese, or French components and the entire combination of the selected components is provided as an individual package.

The creation of the individual package by the package provider on a case-by-case basis, however, leads to an increase in human and time costs for management, check, and distribution of a large number of packages and for media creation. Therefore, there has been used a method in which a vendor provides a primary software package (hereinafter, referred to as "single package") including all components that can be selected and a user selects components to be introduced at installation. This structure is often used at the time of distributing office applications.

Under the present situation, however, with the enhancement of the functions of software programs, there is a tendency of an increase in file size of the components constituting a single package and it leads to a large increase in size of the single package. In recent years, a software package is frequently distributed over a network such as the Internet. In distributing this type of single package over a network, there has been a tendency of an increase in load on a server performance or load on the network and in volume of the software package in the storage device of a server or a user.

Therefore, there has been suggested a method of distributing a single package over a network with a reduction of a load on a server or a network even if the single package size increases (for example, as disclosed in Japanese Laid-Open Patent Publication No. Hei 8(1996)-83245 and Japanese Laid-Open Patent Publication No. 2000-285048

SUMMARY OF THE INVENTION

Although the methods described in the above-referenced patent documents are useful to reduce load on a server and a network for distributing a gigantic package, eventually there is a need to download the entire package to a client. Specifically, the entire software package is downloaded independently of whether or not the components are needed for the client to which they are downloaded.

Accordingly, if the package size is large, time of occupying a network becomes longer in downloading a software package thereof, thereby resulting in less relief of load on the network. Furthermore, a recording apparatus of the client to which the entire software package is downloaded has to be provided with a sufficient recording area so as to temporarily record the entire package. Nowadays, a current cellular phone and a personal digital assistant are connected to the Internet, but, in general, they are small in size and low in function compared with a personal computer. Therefore, a sufficient memory area cannot be secured. Diversified software in these days is composed of a large number of components. In a distribution and packaging of the software, however, from a viewpoint of easiness of a file control, easiness of controlling a position at which a file is kept or the like, it is strongly required to use a single package in which a plurality of components are put together. In a conventional packaging method, however, the software has not been able to be provided in a single package for an apparatus such as a cellular phone and a personal digital assistant due to the problems described above.

Therefore, it is an object of the present invention to provide, in reconfiguring a software package using predetermined components, a method of enabling configuration of a software package that reduces a network load and does not temporarily require a large recording area at a client side, and a data structure of data in the software package to be provided.

Therefore, the present invention provides a method of configuring a software package as described below.

According to the present invention, there is provided a package configuration method of configuring a secondary software package in a second computer by receiving one or more components of a primary software package recorded in a first computer, the method comprising and allowing the second computer to perform the steps of: receiving, from the first computer, combination information on a combination of the one or more components and position information for indicating storage locations of the components recorded in the first computer; receiving a selection of a part or all of the one or more components from a user; determining the combination of the components selected based on the combination information; requesting the selected components from the first computer based on the determination of the combination and the position information corresponding to the selected components; receiving the selected components; and configuring the secondary software package using the received components.

Therefore, according to the method of the present invention, a client determines the combination of the components based on the combination information stored in a server and configures a package based on the determination result. Accordingly, the client only needs to download required components without a need to download and record all components stored in the server.

Specifically, according to the present invention, individual components are sent in configuring the package, whereby the load on the network between the server and the client can be reduced. In addition, the structure of the single package is divided into "blocks" and a new package completes by connecting required blocks at downloading to the client. Therefore, it is possible to configure a package not requiring a recording area for working on the client side.

More specifically, in addition to the above structure, a digital signature is appended to the combination information in the package, so that the client verifies the legitimacy of the combination information in the package by way of the digital signature. In this structure, the verification with the digital signature is performed when the combination information is read out. Therefore, it is possible to configure the package under reliable certification of the provider for the combination information.

According to the present invention, when a client configures a package, the combination of components is determined and only the selected components are received based on the determination result, thereby reducing load on the network between the server and the client. Moreover, the entire single package is not recorded, whereby the package can be configured without a need for a temporary recording area for working on the client side.

DETAILED DESCRIPTION OF THE INVENTION

Embodiments of the present invention will now be described in detail hereinafter with reference to the accompanying drawings.

Figure 1:
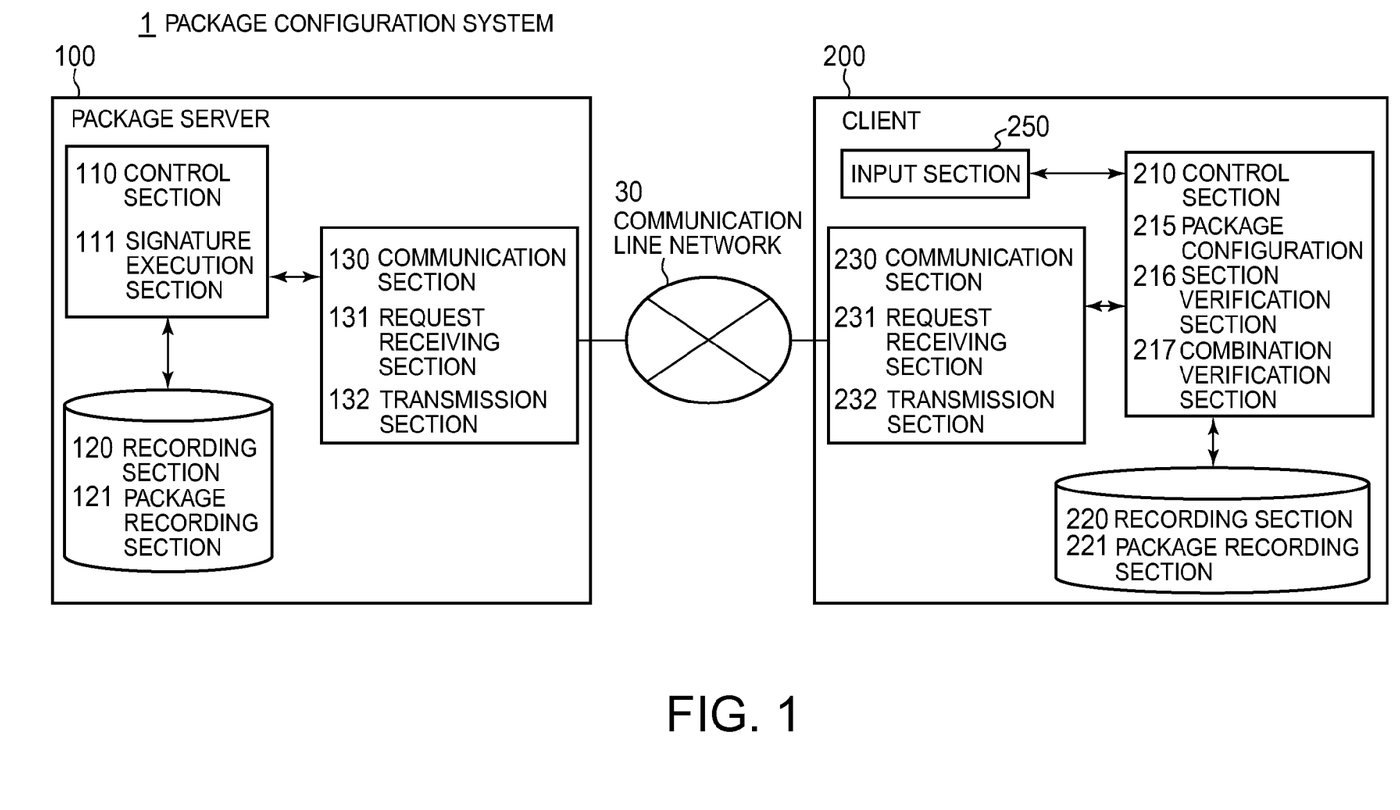
FIG. 1 is a functional block diagram of a package configuration system.

As shown in FIG. 1, a package configuration system 1 includes a package server 100, a client 200, and a communication line network 30 for connecting the package server 100 and client 200 with each other. The package configuration system 1 is connected to a plurality of clients 200 and each client 200 may configure a package from the package server 100.

The package server 100 (first computer) stores a software package provided by a primary provider (hereinafter, referred to as "single package") and records components, information, and data to be elements of the package configured by the client 200. In this regard, the package server 100 can transmit an arbitrary position from the beginning of the package and size information to the client 200. Moreover, the package server 100 may be an ordinary file server capable of appending a digital signature.

The package server 100 may include a control section 110 for controlling information of the package server 100, a recording section 120 for recording a header, data, information, components, and a single package, and a communication section 130 connected to the communication line network 30 to perform communication.

It should be noted here that the package is a set of software created by combining the above one or more components. Specifically, the package is configured by a mediator, who uses the client 200, through selecting given components from the provided single package. In this specification, a package reconfigured by a user from the single package is assumed to be a private package.

The component may be a software program, data, or the like. For example, one component may be an application program such as text generation software or may be data, such as a library or a device driver, or a software program. Furthermore, it may be a software program including a program for enabling a computer to boot from an error condition at the occurrence of the error or a program for error recovery. The individual components may be continuously recorded (recorded in blocks) into a recording medium, or they may be continuously read from or written into the recording medium at the readout or writing operation, though they are discrete from a physical viewpoint.

The control section 110 is a central processor for computing and controlling information, which operates in the package server 100, and it may be a central processing unit (CPU). It may include a signature execution section 111 for encrypting digital signatures for the information, data, and components constituting the package. The provider who provides the single package appends digital signatures to given information, data, components, and package by using the signature execution section 111 in order to give provider's certification in response to a request related to the package configuration issued from the client 200.

It should be noted here that the digital signature is a method enabling only specific users to receive data without any alteration of the content of data provided by the provider with a combination of public key and hashing. Specifically, in the digital signature, data to be transferred is converted to a digest by hashing and the digest is encrypted to create a signature. The signature is provided to the user with data. Then, the user converts the provided data to a digest by hashing and compares the digest with a digest decrypted using a public key from the received signature. Thereby, only when the digests coincide with each other, the data is considered to be the same as the original and the user is allowed to use the data in the method.

Concretely, the encryption technologies may be an RSA encryption technology or a DSA encryption technology used for a large number of encryption products for supporting electronic commerce or the like or may be an encryption technology based on a specification conforming to X.509, which is one of the standard specifications for electronic keys. Moreover, a hash algorithm used for authentication or for a digital signature may be Secure Hash Algorithm 1 (SHA-1).

Therefore, the primary provider appends a digital signature to a single package or the like and provides it to the user, whereby the user can provide a single package that can be verified not to have been altered by a third party.

The communication section 130 may include a request receiving section 131 for receiving the requests (a header request, a data request, an information request, and a component request) for the package configuration issued from the client 200 and a transmission section 132 for transmitting the header, data, information, and components for the request. The recording section 120 of the package server 100 includes a package recording section 121 for recording the single package.

The client 200 (second computer) configures a package from the single package upon receiving an input from the user. The client 200 may include a control section 210 for controlling information on the client 200, a recording section 220 for recording a header, data, information, components, and a package, a communication section 230 connected to the communication line network 30 to perform communication, and an input section 250 for receiving an input from the user. The client 200 is an information processor and may be a computer, a personal digital assistant, a cellular phone, or the like.

The control section 110 includes a package configuration section 215 for configuring a package at the client 200, a verification section 216 for verifying a digital signature, and a combination determination section 217 for determining the combination of components selected at the client 200.

The package configuration section 215 configures a private package from a header, data, information, and components received from the package server 100. The verification section 216 verifies digital signatures of the header, components, data, and information received from the package server 100. The combination determination section 217 determines the combination of the components based on the combination information received from the package server 100.

A request transmission section 232 transmits requests (header request, data request, information request, and component request) for the package configuration to the package server 100 upon receiving the input from the user. The input section 250 is a user interface that receives an input from the user. For example, it may be a keyboard, a pointing device, or the like.

It should be noted here that the client 200 configures a secondary software package (hereinafter, referred to as "private package") based on the components, information, and data transmitted from the package server 100. Specifically, the client 200 downloads only the beginning portion based on the position information of the file received from the package server 100 having a file transfer function from the ordered position information. The client 200 acquires information, which is necessary for configuring the package from the downloaded components in the beginning portion, from the package server 100. Specifically, the client 200 acquires arrangement information in the package of information such as a component list in the package, name or other information associated with components, and combination information on component combinations. Moreover, the client 200 configures a package based on the acquired arrangement information.

Furthermore, the client 200 may display a display screen or the like for prompting a user's selection of the components based on the package configuration information acquired from the package server 100. In the component selection, here, a program preset in the client 200 may be used for the selection.

Note here that the user who configures the package from one or more components by operating the client 200 may be an intermediate provider (mediator) who handles the transaction of the package between the provider who provides the single package and a customer. Specifically, in a preferred embodiment of the present invention, packages may be configured like a chain reaction among providers, in such a way that a secondary provider who configured a private package from a single package allows a child client (third computer) to configure a package tertiarily (tertiary package).

Figure 2:
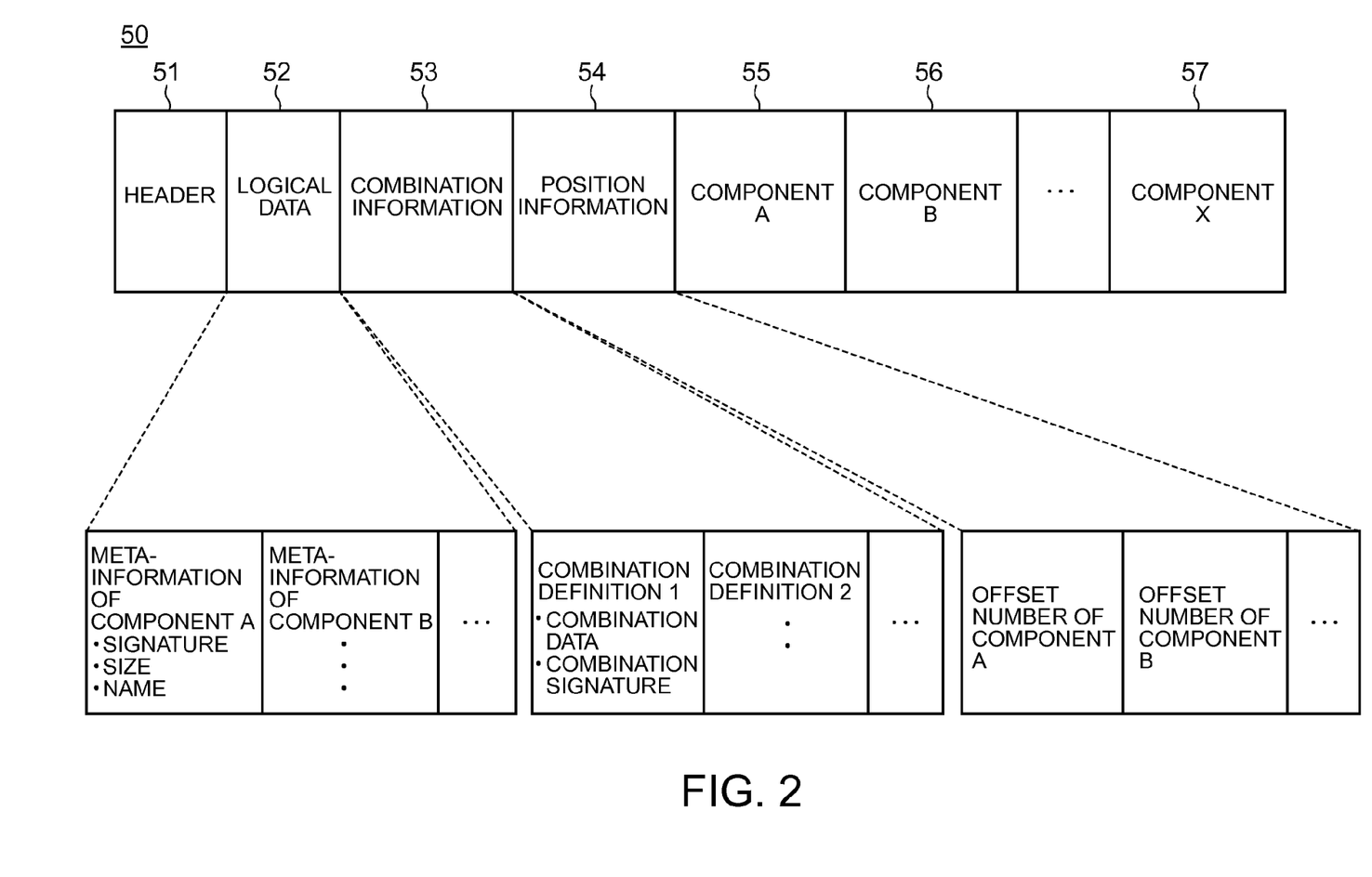
FIG. 2 is a diagram showing a data structure of a single package.

Subsequently, the single package provided by the primary provider will be described with reference to FIG. 2. The single package is recorded into the package server 100. If the package is configured in the child client here, a private package configured in the client 200 corresponds to the single package described here.

The single package 50 is provided before the user configures a package. Therefore, a person who provides the single package 50 may be the primary provider or the secondary provider. In the description of the preferred embodiment of the present invention, the single package 50 is described as a package provided by the primary provider and the private package 60 is described as a package configured by the secondary provider to clarify the description. As described above, however, the client 200 that configured a package from components received from the package server 100 can function as a package server 100 to allow the child client to configure a package in this preferred embodiment of the present invention. Therefore, in the preferred embodiment of the present invention, it is possible to configure packages among providers like a chain reaction.

The single package 50 includes a header 51, logical data 52, which is information on components, combination information 53, position information 54, and components. More specifically, the single package 50 has the header 51 including header information of the single package 50, the logical data 52 including meta-information on the respective components, the combination information 53 including information on combinations of the components, and the position information 54 including information on the storage locations of the packages, and includes a component A (55) to a component X (57) provided to be selected by a user.

Figure 3:
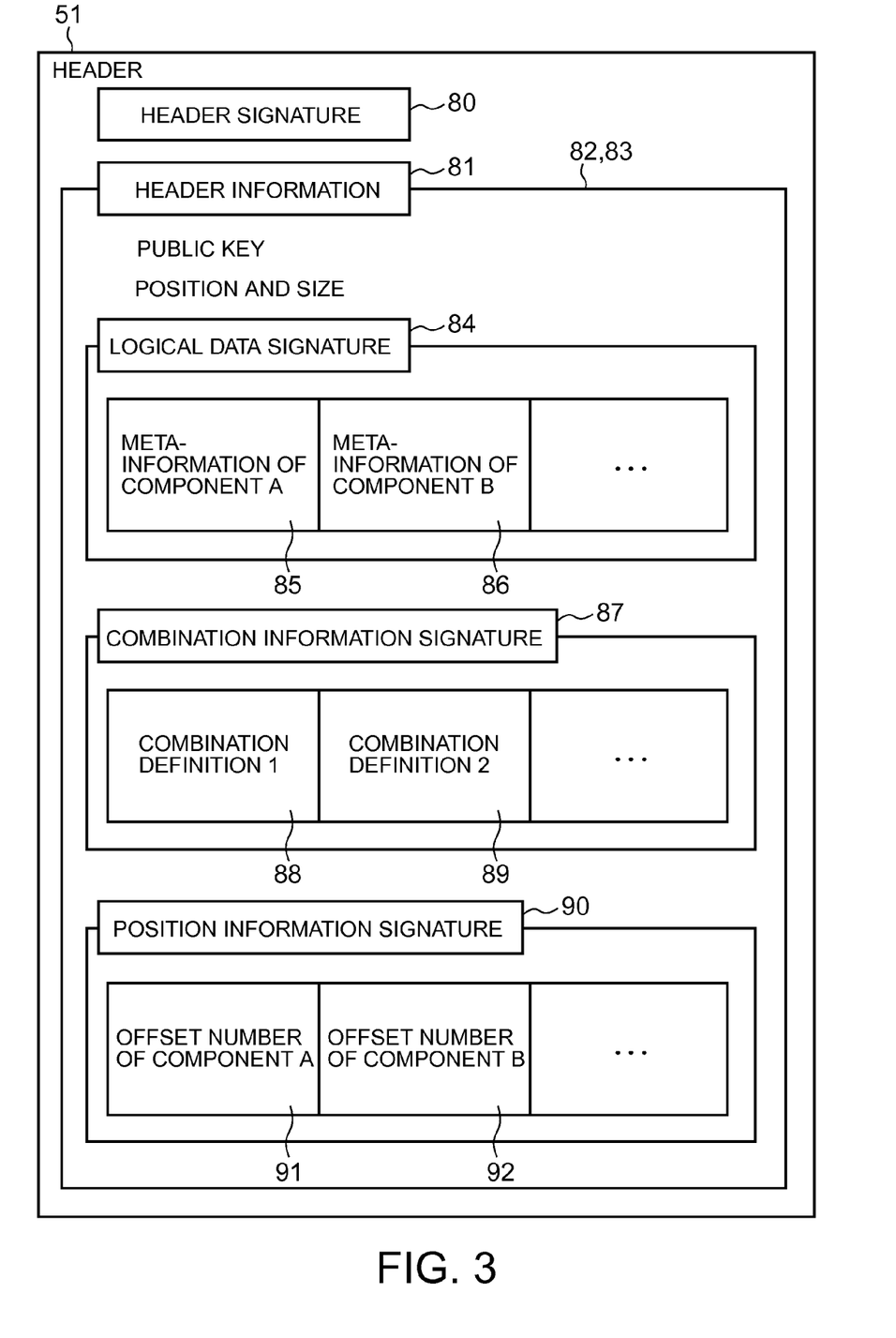
FIG. 3 is a diagram showing a data structure of a header.

As shown in FIG. 3, the header 51 is composed of a header signature 80 and header information 81. More specifically, the verification section 216 of the client 200 verifies the header with the header signature 80 and thereafter the client 200 can handle the header information 81. In this embodiment, the client 200 can read out the header 51 and the header signature 80 after receiving the single package 50 and can read out the content of the header information 81 after the digital signature with the header signature 80 is authenticated.

The header information 81 includes information on the positions and sizes 83 of the logical data 52, the combination information 53, and the position information 54, a public key 82 to each digital signature, logical data signature 84, combination information signature 87, and position information signature 90. More specifically, the header 51 includes the signatures of the logical data 52, the combination information 53, and the position information 54, thereby enabling verification with the digital signatures when receiving the data and information.

For example, a digest of the combination information 53 is created with the combination information signature 87 and the public key 82 included in the header 51, and the digest is compared with a digest created from the combination information 53 in the single package 50, whereby the combination information 53 is verified with the digital signature.

The logical data 52 is provided with meta-information of components (information on the components themselves, in other words, the signature, size, name and the like of each component) by the number of components. For example, in FIG. 2, the logical data 52 includes the meta-information of the component A (55), the meta-information of the component B (56), and so on up to the meta-information of the component X (57) for the respective components in such a way as to be collectively recorded, instead of being discretely recorded, in the single package 50.

The combination information 53 relates to combinations assured by the primary provider among the combinations of the components. The combination information includes combination definitions each defining one combination by the number of the combinations. The combination information 53 includes combination definitions each including information on one combination by the number of combinations assured by the primary provider. The combination definitions may include data made of collected signatures of the components under the combination (hereinafter, referred to as "combination data"). Moreover, the combination information may include a signature created from the combination data (hereinafter, referred to as "combination signature") in order to assure the combination data. In this instance, the verification section 216 verifies the combination data and the combination determination section 111 compares the combination data with the above list to determine the combination. In this regard, the combination signature may be used to assure the legitimacy of the combination data. More specifically, the verification section 113 may verify the legitimacy of the combination data by using the combination signature. If this is the case, the verification section 216 verifies both of the combination information 53 and the combination data in the combination information.

The position information 54 includes information on physical positions (offset numbers or the like) where the components are stored. The position information 54 varies according to a package and therefore the content is altered and recorded after the package configuration.

Figure 5:
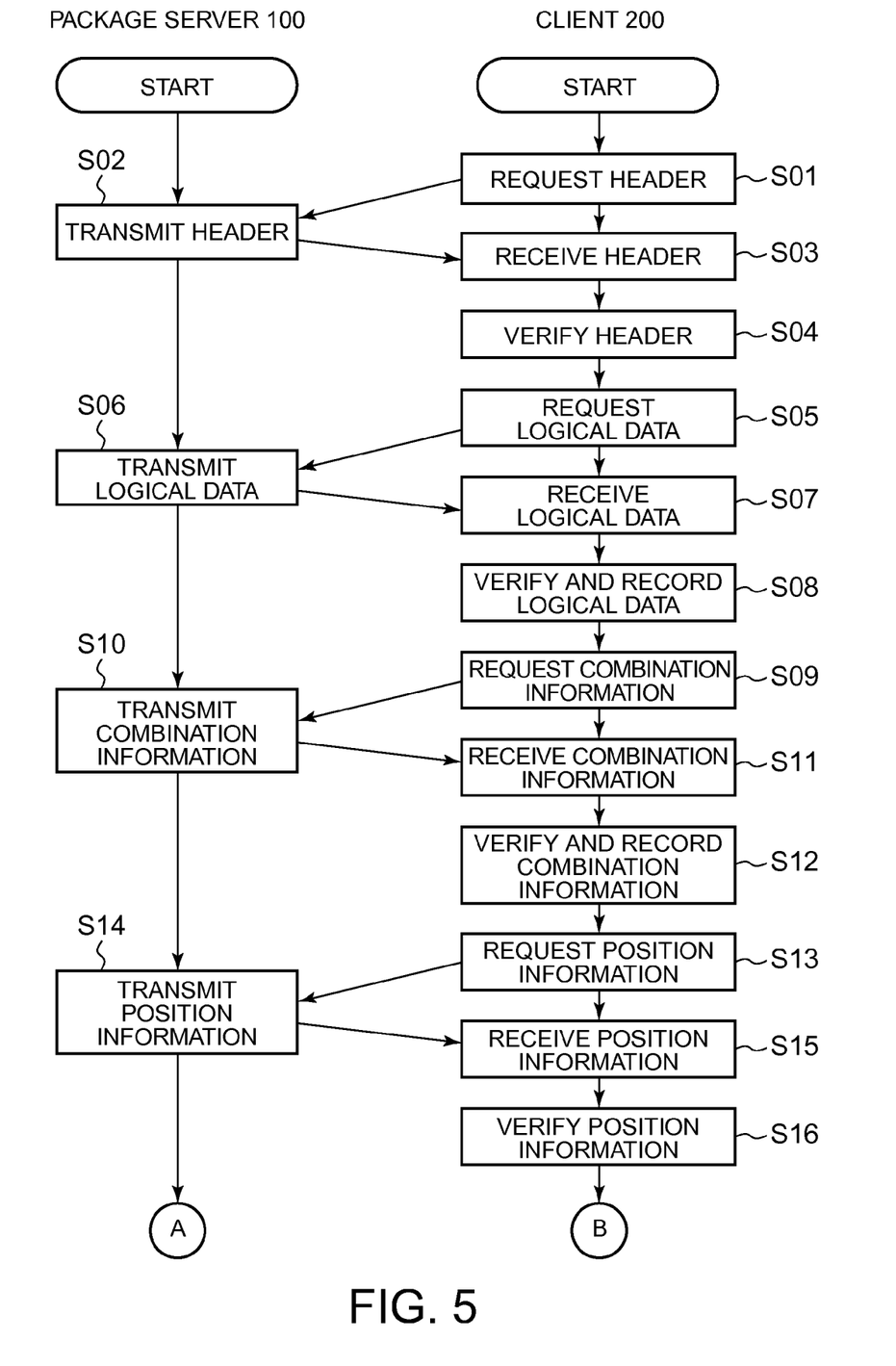
FIG. 5 is a flowchart showing an operation executed by the package configuration system.
Figure 6:
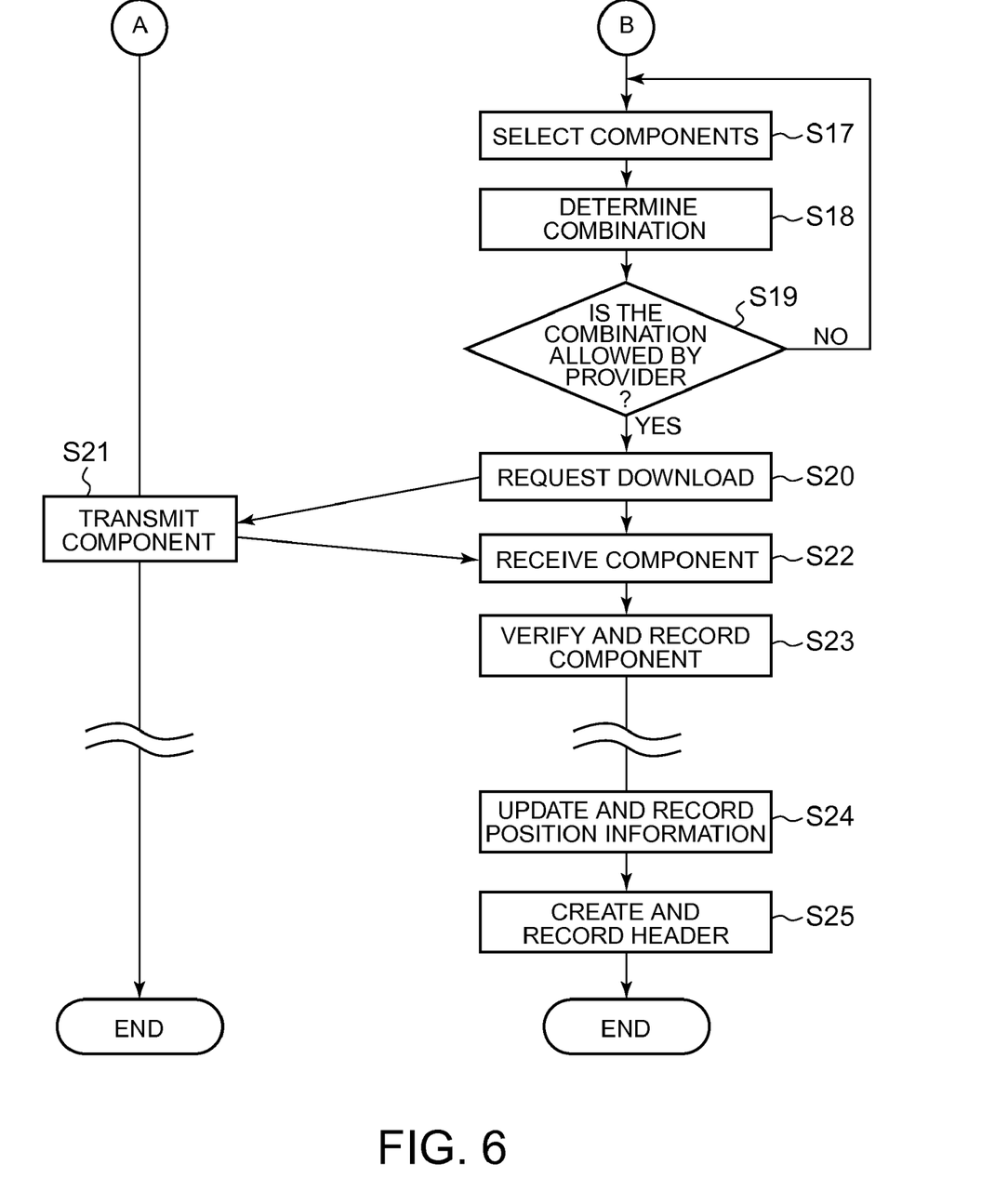
FIG. 6 is a flowchart showing an operation executed by the package configuration system 1.

Subsequently, concrete operations executed by the package configuration system 1 will be described by using the flowcharts shown in FIG. 5 and FIG. 6.

First, the request transmission section 232 of the client 200 requests the header 51 from the package server 100 (step S01). The request receiving section 131 of the package server 100 receives the request and transmits the header 51 of the single package 50 to the client 200 (step S02). A receiving section 231 of the client 200 receives the header 51 (step S03). Thereafter, the verification section 216 verifies the received header 51 (step S04).

The header 51 includes the header, the header signature, and the public key. Therefore, the verification section 216 converts the received header itself to a digest by hashing and compares the digest with a digest created by decrypting the header signature using the public key. Thereby, only when these digests coincide with each other, the user is allowed to use the header.

Then, the request transmission section 232 of the client 200 requests the logical data 52 (step S05). Upon receiving the request, the request receiving section 131 of the package server 100 transmits the logical data 52 of the single package 50 to the client 200 (step S06). The receiving section 231 of the client 200 receives the logical data 52 (step S07). Thereafter, the verification section 216 of the client 200 verifies the received logical data 52. The package configuration section 215 records the verified logical data 52 (step S08).

The verification section 216 verifies the received logical data 52 by using the signature of the logical data 52 and the public key included in the header 51 received earlier. More specifically, the verification section 216 converts the received logical data 52 to a digest using the hashing algorithm and compares the digest with a digest created by decrypting the signature of the logical data 52 recorded in the header 51 using the public key. Thereby, only when these digests coincide with each other, the user is allowed to use the logical data 52.

Subsequently, the request transmission section 232 of the client 200 requests the combination information 53 (step S09). Upon receiving the request, the request receiving section 131 of the package server 100 transmits the combination information 53 of the single package 50 to the client 200 (step S10). The receiving section 231 of the client 200 receives the combination information 53 (step S11). Thereafter, the verification section 216 of the client 200 verifies the received combination information 53. The package configuration section 215 records the verified combination information 53 (step S12).

The verification section 216 verifies the received combination information 53 by using the signature of the combination information 53 and the public key included in the header 51 received earlier in the same manner as for the logical data 52 in the above. More specifically, the verification section 216 converts the received combination information 53 to a digest by hashing and compares the digest with a digest created by decrypting the signature of the combination information 53 recorded in the header 51 using the public key. Thereby, only when these digests math with each other, the user is allowed to use the combination information 53.

Subsequently, the request transmission section 232 of the client 200 requests the position information 54 (step S13). Upon receiving the request, the request receiving section 131 of the package server 100 transmits the position information 54 of the single package 50 to the client 200 (step S14). The receiving section 231 of the client 200 receives the position information 54 (step S15). Thereafter, the verification section 216 of the client 200 verifies the received position information 54 (step S16).

The verification section 216 verifies the received position information 54 by using the signature of the position information 54 and the public key included in the header 51 received earlier in the same manner as for the logical data 52 in the above. More specifically, the verification section 216 converts the received position information 54 to a digest by hashing and compares the digest with a digest created by decrypting the signature of the position information 54 recorded in the header 51 using the public key. Thereby, only when these digests math with each other, the user is allowed to use the position information 54.

Subsequently, the client 200 receives a selection of components from the user (step S17). More specifically, the client 200 lists the types of components to be downloaded from the header 51 or the logical data 52 to show them to the user. The user selects components via the input section 250 of the client 200. In this regard, the components may be automatically selected by means of a program preset in the client 200, instead of the user's selection of the components.

The combination determination section 217 of the client 200 determines the combination of the components selected by the user or the program operating at the client 200 on the basis of the recorded combination information (step S18). For example, the combination determination section 217 determines the combination by comparing the list of the components selected by the user with the combination list of the components recorded in the combination information 53.

If the combination determination section 217 determines that the combination is allowed by the primary provider (step S19), the request transmission section 232 requests downloading the components (step S20). On the other hand, if the combination determination section 217 determines that the combination is not allowed by the primary provider (step S19), the package configuration with this combination is not allowed and therefore the component selection is performed again (step S17).

Subsequently, the components of the assured combination are sequentially downloaded (steps S20 to S23).

More specifically, the request transmission section 232 of the client 200 requests downloading one component (step S20). Upon receiving the request, the request receiving section 131 of the package server 100 transmits one component of the single package 50 to the client 200 (step S21). The receiving section 231 of the client 200 receives the component (step S22).

In this regard, when performing the communication between the package server 100 and the client 200, the communication may be made by using a protocol in which offset of data to be transmitted or received can be specified (the Hypertext Transfer Protocol (HTTP) or the File Transfer Protocol (FTP)). More specifically, when the download is requested, the component is received based on the offset number by reading the offset number of the component to be downloaded from the position information 54 transmitted by the package server 100. In this instance, the client 200 can download the component by specifying the location of the component to be downloaded. Therefore, efficient downloading is achieved.

In the HTTP, the request transmission section 232 of the client 200 may issue the request of downloading the specified component by specifying an offset using a GET command. In the FTP, the request transmission section 232 of the client 200 may issue the request of downloading the specified component by specifying an offset using a REST command. In this regard, the communication may be performed between the package server 100 and the client 200 by using a remote file system such as the Network File System (NFS) or the Common Internet File system (CIFS).

Subsequently, the verification section 216 of the client 200 verifies the received component. The package configuration section 215 records the verified component (step S23).

The verification section 216 verifies the received component by using the component signature and the public key included in the logical data 52 received earlier (step S23). More specifically, the verification section 216 converts the received component to a digest by hashing and compares the digest with a digest created by decrypting the component signature using the public key. Thereby, only when these digests coincide with each other, the user is allowed to use the component.

Figure 4:
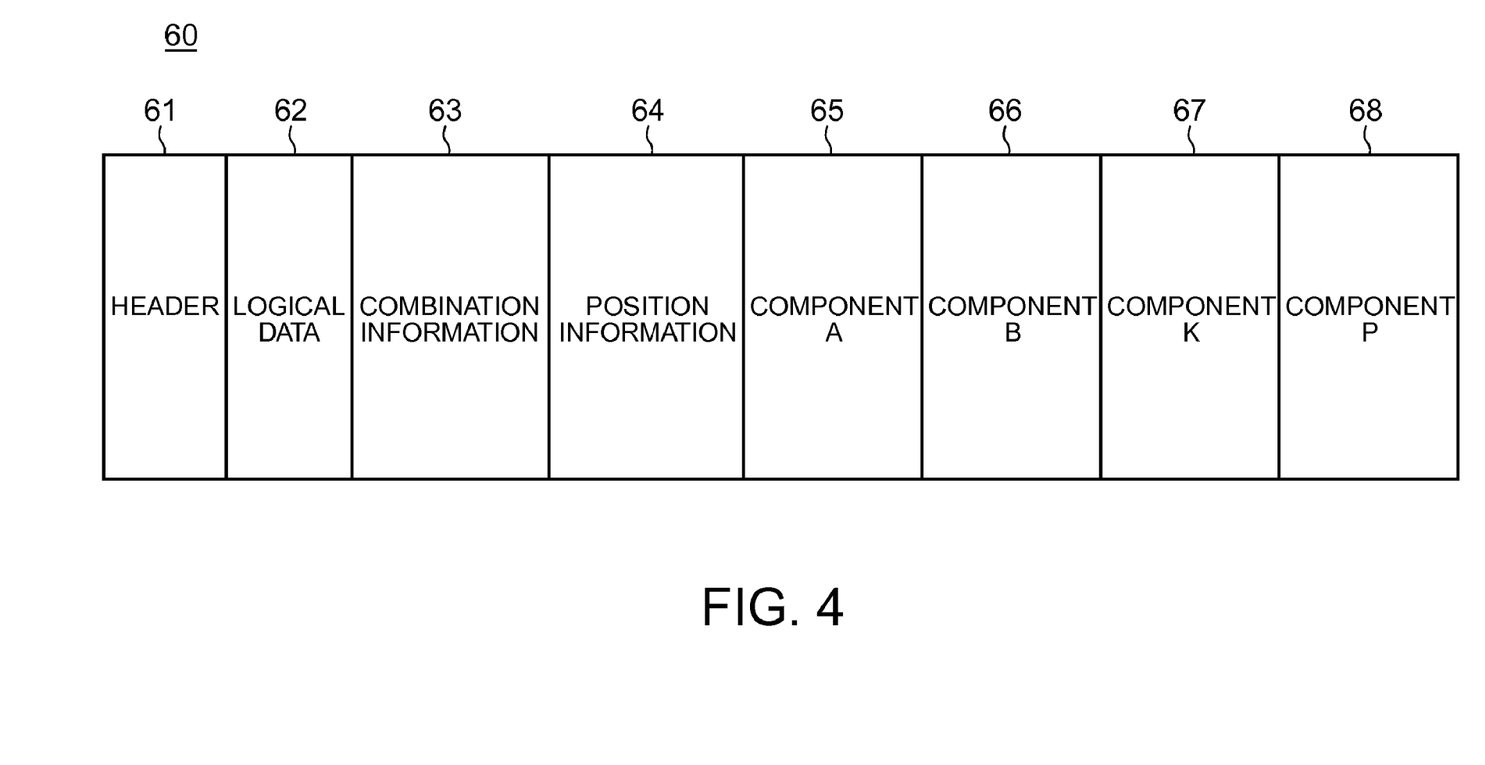
FIG. 4 is a diagram showing a data structure of a private package.

The components for the private package 60 may be continuously recorded from the downloaded components. More specifically, the order of downloading may be the same as the order of recording the components into the private package 60.

If all components of the combination selected by the user complete to be downloaded, the position information 64 is updated and recorded lastly (step S24) (See FIG. 4). The position information 64 differs from the position information 54, which is the storage location of the single package 50. Therefore, the position information received in step S15 is temporarily recorded and the package configuration section 215 calculates the position information 64 based on the information on the physical storage location where the components of the configured package are recorded and then records it into the private package 60.

Subsequently, the header 61 is created and recorded (step S25). Similarly to the header 51, the header 61 includes a header signature, a logical data signature, a combination information signature, and a position information signature. Note here that the logical data signature and the combination information signature are the same as the logical data signature 84 and the combination information signature 87 of the single package 50. The position information signature, however, differs from the position information signature 90 of the single package 50. Therefore, the package configuration section 215 creates the position information signature based on the position information 64 and adds it to the header information.

Thereafter, the package configuration section 215 creates the header signature from the header information, creates the header 61 from the header information and the header signature, and records the header 61 into the private package 60 (step S25). In this regard, the header signature 80 is for use in verifying the header 51 at the client 200. The header 51 is the first information as an element of the package. Therefore, the verification of the header 51 with the signature is the same as the verification of the entire package.

By configuring the package in this manner, general data (logical data and combination information) carried over to the client 200 like a chain reaction is downloaded thereto first and required information and data are recorded. Then, the components necessary for the package to be configured are determined and thereafter the components can be downloaded by specifying the position information of the file to which the components are downloaded (so to speak, with pinpoint accuracy). Moreover, the downloaded components may be recorded only continuously in the order of downloading. As a result, it is possible to download the information, data, and components for efficiently configuring the package.

The example in FIG. 4 shows a private package 60 in a case where the user selects components A, B, K, and P as components and the combination of the components are assured by the primary provider.

While the embodiment has been described with reference to the flowcharts in FIG. 5 and FIG. 6 in which the logical data, the combination information, and the position information are downloaded in this order from the package server 100 to the client 200, the order of the data and information may be arbitrary.

While the digital signature has been verified every time the verification section 216 receives the information, data, and component in the above description, the digital signature may be verified appropriately after the information or the like is recorded into the client 200, instead of verifying the digital signature immediately after the information or the like is received.

As described hereinabove, according to the present invention, the private package can be configured without receiving all components recorded in the single package. Moreover, only the combination of components assured by the primary provider is allowed based on the combination information at the configuration of the private package, whereby the package can be configured under the certification of the primary provider. In addition, the content can be assured by the digital signature for the configured private package, whereby the configured private package can be provided to a second mediator without any unauthorized alteration made by a third party.

Moreover, in this specification, it has been described that the single package 50 is provided by the primary provider at the beginning and the private package 60 is configured by the mediator in order to discriminate between the single package 50 and the private package 60. It will be apparent to those skilled in the art, however, that the single package 50 in this specification corresponds to a primary private package 60 when a secondary private package 60 (tertiary software package) is configured based on the primarily configured private package 60.

More specifically, regarding the configuration of the tertiary software package, the child client configures the secondary software package in the client 200 by receiving one or more components of the primary software package recorded in the package server 100 and configures the tertiary software package by receiving one or more components of the secondary software package recorded in the second computer. In this instance, the child client receives the combination information on the combination of one or more components and the position information indicating the storage locations of the components recorded in the client 200, receives the selection of a part or all of the one or more components from the user, determines the combination of the components selected based on the combination information, requests the selected components from the client 200 based on the determination of the combination and the position information corresponding to the selected components, receives the selected components, and configures the tertiary software package using the received components. Therefore, the software package can be configured for the tertiary software in addition to the primary software and the secondary software. Moreover, it will be apparent to those skilled in the art that software packages can be configured like a chain reaction also regarding the higher order software packages such as the quaternary and quintic software packages.

The present invention is feasible by means of a computer program for each computer operating in the package configuration system 1 (FIG. 1) as one embodiment. A storage medium for storing the above program may be electronic, magnetic, optical, electromagnetic, infrared, or semiconductor system (or apparatus or device) or propagation medium. As examples of a computer-readable medium, there are a semiconductor or solid-state storage device, and magnetic tape. As examples of a removable and computer-readable medium, there are a semiconductor or solid-state storage device, magnetic tape, a removable computer diskette, a random access memory (RAM), a read-only memory (ROM), a rigid magnetic disk, and an optical disk. As examples of the optical disk at this time, there are a compact disk read-only memory (CD-ROM), a compact disk read/write (CD-R/W), and a DVD.

While the preferred embodiments of the present invention have been described hereinabove, it is to be understood that the illustrative embodiments have been provided merely for the purpose of explanation with examples and it is not intended to particularly limit the present invention. Moreover, the effects described in the embodiments of the present invention have been enumerated merely as the most preferable effects achieved by the present invention, but the effects of the present invention are not limited to those described in the embodiments of the present invention.

What is claimed is:

1. A package configuration method of configuring a secondary software package performed in a second computer by receiving one or more components of a primary software package recorded in a first computer, the method causing the second computer:

receive, from the first computer, combination information on a combination of the one or more components and position information for indicating physical storage locations of the components recorded in the first computer;

receive a selection of a part or all of the one or more components from a user;

determine a combination of the components selected based on the combination information;

request the selected components from the first computer based on the determination of the combination and the position information corresponding to the selected components;

receive, on the second computer, the selected components based on the position information corresponding to the selected components;

configure, on the second computer, the secondary software package using the received components;

delete, from the second computer, the position information indicating the physical storage locations of the components recorded in the first computer;

create new position information for indicating physical storage locations of the components of the secondary software package recorded in the second computer; and provide one or more components of the secondary software package to a third computer, the providing including providing the new position information to the third computer.

2. The method according to claim 1, wherein the configuring of the secondary software package includes configuring the secondary software package by using the received components, the combination information on the combination of the received components, and the position information indicating the storage locations of the received components.

3. The method according to claim 1, wherein the secondary software package is configured in the second computer by receiving one or more components of the primary software package recorded in the first computer, and a tertiary software package is configured in the third computer by receiving the one or more components of the secondary software package recorded in the second computer, and the providing allows the third computer to:

receive, from the second computer, combination information on a combination of the components and the new position information for indicating the storage locations of the components recorded in the second computer;

receive a selection of a part or all of the one or more components from a user;

determine a combination of the components selected based on the combination information;

request the selected components from the second computer based on the determination of the combination and the position information corresponding to the selected components;

receive the selected components; and configure the tertiary software package using the received components.

4. The method according to claim 3, wherein the configuring of the tertiary software package includes configuring a package using the combination information, the new position information, and the received components.

5. The method according to claim 1, further comprising appending digital signatures to each of the one or more components and verifying the components received on the second computer by way of the digital signatures.

6. The method according to claim 1, further comprising appending a digital signature to the combination information and verifying the received combination information by way of the digital signature.

7. The method according to claim 1, further comprising appending a digital signature to the entire package that has been configured.

8. The method according to claim 1, further comprising:
allowing the third computer to:
receive, on the third computer, the one or more components of the secondary software package based on the new position information corresponding to the one or more components.

9. The method according to claim 8, further comprising:
deleting, from the third computer, the new position information indicating the physical storage locations of the components recorded in the second computer; and
creating further new position information for indicating physical storage locations of the components of a tertiary software package recorded in the third computer.

* * * * *